US011895458B2

(12) United States Patent
Okada et al.

(10) Patent No.: US 11,895,458 B2
(45) Date of Patent: Feb. 6, 2024

(54) HEADBAND FOR HEADPHONES AND HEADPHONES

(71) Applicant: PANASONIC INTELLECTUAL PROPERTY MANAGEMENT CO., LTD., Osaka (JP)

(72) Inventors: Naoya Okada, Fukuoka (JP); Tetsuhiro Akiyoshi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 114 days.

(21) Appl. No.: 17/825,644

(22) Filed: May 26, 2022

(65) Prior Publication Data

US 2022/0386008 A1 Dec. 1, 2022

(30) Foreign Application Priority Data

May 28, 2021 (JP) ................................ 2021-090459

(51) Int. Cl.
*H04R 1/10* (2006.01)

(52) U.S. Cl.
CPC ........... *H04R 1/105* (2013.01); *H04R 1/1008* (2013.01); *H04R 1/1066* (2013.01)

(58) Field of Classification Search
CPC ........ H04R 1/10; H04R 1/105; H04R 1/1066; H04R 1/1008; H04R 5/033; H04R 5/0335
See application file for complete search history.

(56) References Cited

U.S. PATENT DOCUMENTS

| | | | | |
|---|---|---|---|---|
| 5,406,037 | A | 4/1995 | Nageno et al. | |
| 2019/0110122 | A1* | 4/2019 | Zelnick | H04R 1/1066 |
| 2020/0029145 | A1 | 1/2020 | Kamimura | |
| 2020/0280794 | A1* | 9/2020 | Minerbi | H04R 1/1008 |

FOREIGN PATENT DOCUMENTS

| | | | | | |
|---|---|---|---|---|---|
| CN | 109348331 | A | * | 2/2019 | H04R 1/10 |
| CN | 112806027 | A | * | 5/2021 | H04R 1/1008 |
| JP | 6-292289 | | | 10/1994 | |
| JP | 2013-138349 | | | 7/2013 | |
| JP | 2017-98869 | | | 6/2017 | |

OTHER PUBLICATIONS

Extended European Search Report issued in Corresponding EP Patent Application No. 22175750.3, dated Nov. 4, 2022.

* cited by examiner

*Primary Examiner* — Thang V Tran
(74) *Attorney, Agent, or Firm* — Greenblum & Bernstein, P.L.C.

(57) ABSTRACT

A headband portion for headphones includes a headband spring configured to be bent in a substantially semicircular arc shape so as to be expandable so that a central portion of the headband spring is disposed in a vicinity of a head top portion of a wearer and a pair of both end portions of the headband spring are arranged on both side head portions of the wearer in response to the headphones being placed on the wearer's head, a pair of holding members configured to hold the both end portions by inserting the both end portions thereinto, and a pair of stepped screws that passes through both end side portions of the headband spring in a plate thickness direction of the headband spring and that holds the headband spring movably in an axial direction of the pair of stepped screws with gaps between flange portions of the pair of stepped screws and the holding members.

9 Claims, 9 Drawing Sheets

HEADBAND FOR HEADPHONES AND HEADPHONES

CROSS-REFERENCE TO RELATED APPLICATIONS

This application is based on and claims priority under 35 USC 119 from Japanese Patent Application No. 2021-090459 filed on May 28, 2021, the contents of which are incorporated herein by reference.

TECHNICAL FIELD

The present disclosure relates to headphones.

BACKGROUND ART

Headphones including a pair of left and right housings in which speaker drivers that output audio signals as sounds are respectively housed, and a headband that connects the pair of left and right housings is known (see, for example, JP-A-2013-138349). In the headphones, ear pads that cover entire ears of a wearer are provided on facing surfaces of the pair of left and right housings. This type of headphones (so-called over-ear type headphones) is worn in a state where the headband is expanded and the entire wearing surfaces of the ear pads fit peripheries of the ears to sandwich both side head portions of the wearer.

However, in the configuration of JP-A-2013-138349, when a head size of the wearer is large, due to an external force from the wearer in a direction in which the pair of left and right housings are separated from each other, a stress (elastic restoring force) of the expanded headband is increased and a lateral pressure received from the ear pads is increased. Therefore, the peripheries of the ears of the wearer may hurt and a wearing feeling of the wearer may deteriorate.

SUMMARY OF INVENTION

The present disclosure has been made in view of the above-described related-art circumstances, and an object thereof is to provide headphones that prevent a variation in a lateral pressure from ear pads of the headphones due to a head size of a wearer, and that provide a comfortable wearing feeling of the headphones regardless of the head size of the wearer.

Aspect of non-limiting embodiments of the present disclosure relates to provide headphones including: a headband spring having a plate-spring shape, and being bent in a substantially semicircular arc shape so as to be expandable in a longitudinal direction orthogonal to a plate width direction of the headband spring so that a central portion of the headband spring is disposed in a vicinity of a head top portion of a wearer and a pair of both end portions of the headband spring are arranged on both side head portions of the wearer, a pair of holding members having rigidity to restrict elastic deformation of the headband spring in a plate thickness direction of the headband spring, and configured to hold the pair of both end portions by inserting the pair of both end portions into the pair of holding members, and a pair of stepped screws that passes through both end side portions of the headband spring in the plate thickness direction and is screwed to the pair of holding members, and that holds the headband spring movably in an axial direction of the pair of stepped screws with gaps between flange portions of the pair of stepped screws and the pair of holding members, the gaps being larger than a plate thickness of the headband spring, and the both end side portions of the headband spring being arranged in the plate width direction.

According to the present disclosure, it is possible to prevent a variation in a lateral pressure from the ear pads of the headphones due to a head size of a wearer, and it is possible to provide a comfortable wearing feeling of the headphones regardless of the head size of the wearer.

DESCRIPTION OF EMBODIMENTS

Hereinafter, an embodiment specifically disclosing headphones according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. The accompanying drawings and the following description are provided for a thorough understanding of the present disclosure by those skilled in the art, and are not intended to limit a subject matter recited in the claims.

Figure 1:
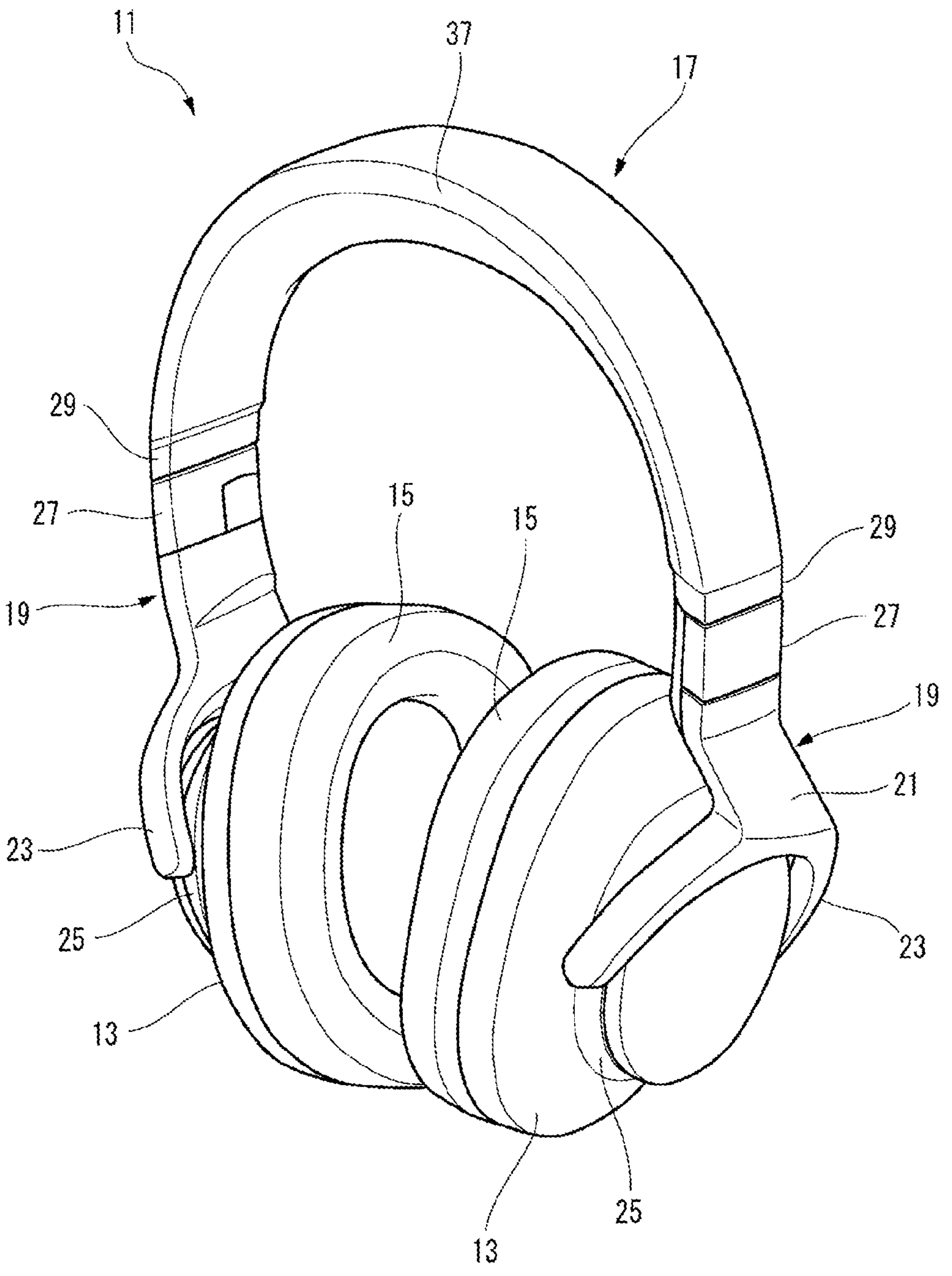
FIG. 1 is a perspective view of headphones according to a first embodiment.

FIG. 1 is a perspective view of headphones 11 according to a first embodiment. The headphones 11 according to the first embodiment include a pair of left and right housings 13 in which a pair of speakers that acoustically output an input audio signal as sound are respectively housed. An ear pad 15 that is configured to cover an entire ear of a wearer (hereinafter, also referred to as "user") is attached to a facing surface of each of the left and right housings 13. An entire wearing surface of the ear pad 15 fits a side head portion including a periphery of the ear of the user in response to being the headphones 11 placed on the wearer's head. Accordingly, the headphones 11 are worn in a state where the ear pads 15 sandwich both left and right side head portions of the user. The pair of left and right housings 13 are attached to both ends of a substantially semicircular arc-shaped headband portion 17.

A pair of coupling members 19 are respectively provided between both ends of the headband portion 17 and the housings 13. Each coupling member 19 includes a band connection portion 21 connected to the headband portion 17, and a housing support portion 23 formed in a Y shape that extends from the band connection portion 21 and supports the housing 13. In the coupling member 19, the housing support portion 23 that extends from the band connection portion 21 rotatably supports a columnar portion 25 provided on an outer side surface of each of the left and right housing 13 by a support shaft in a diameter direction thereof. That is, each of the left and right housings 13 is swingably supported around the support shaft (see above) with respect to the corresponding housing support portion 23. Accordingly, the headphones 11 are configured such that the wearing surface of the ear pad 15 freely swings and fits in accordance with a head size different depending on the user. Here, for convenience, the head size different depending on the user is defined as, for example, a size S, a size M, and a size L in ascending order. The head size of the user is not limited to these three sizes, and is merely provided as an example for the sake of convenience in order to make the description easy to understand.

Figure 2:
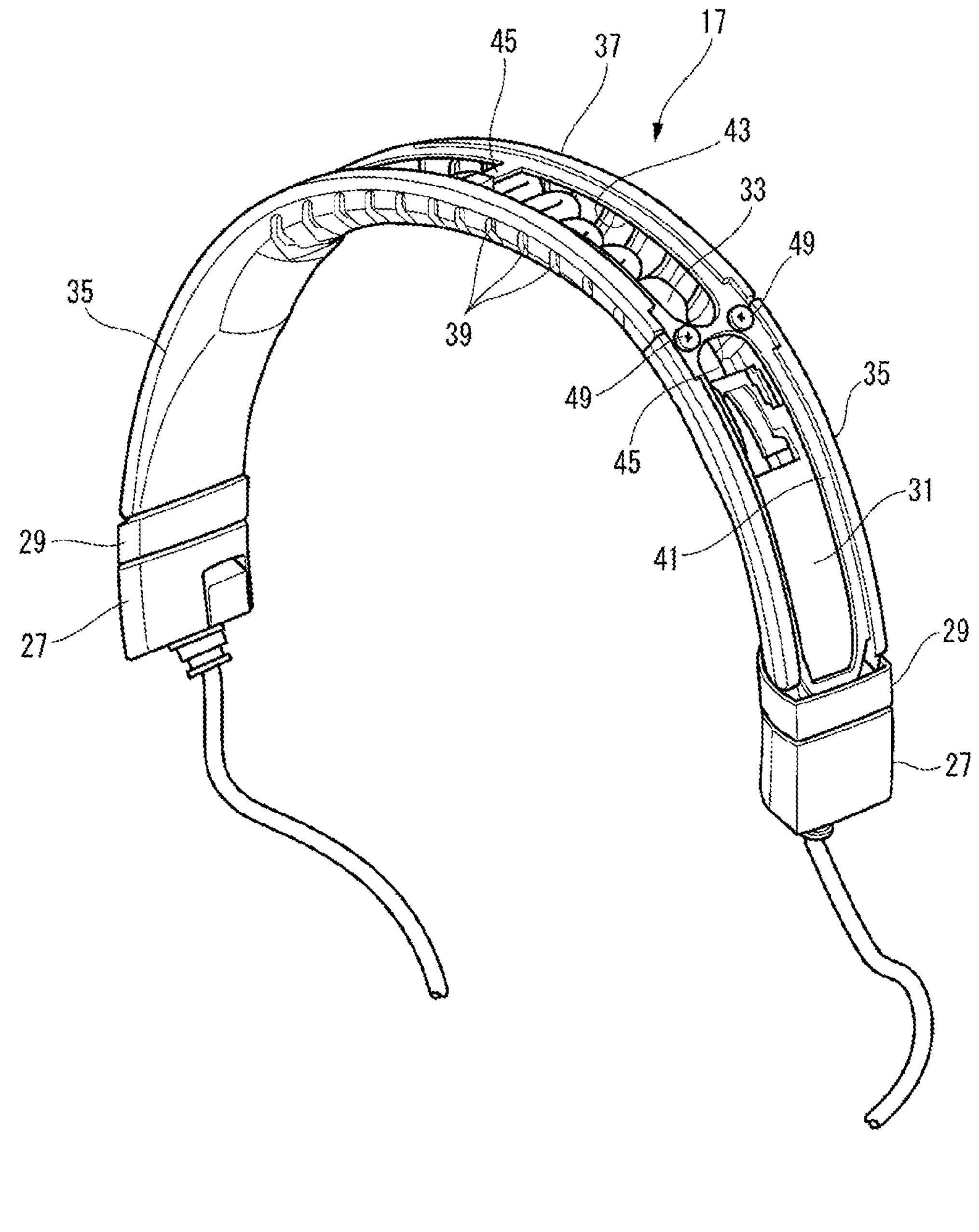
FIG. 2 is a perspective view of a headband portion shown in FIG. 1.

FIG. 2 is a perspective view of the headband portion 17 shown in FIG. 1. Slide portions 27 of the coupling members 19 are respectively inserted into both ends of the headband portion 17. The slide portions 27 include tongue piece portions 31 being slidably inserted in the headband portion 17 from end members 29. The end members 29 are fixed to both end portions of the headband portion 17. When the tongue piece portion 31 is pulled out by a predetermined length from the end member 29 by an operation of the user, the pulling out of the tongue piece portion 31 is restricted by a stopper. Accordingly, a length between both end portions of the headband portion 17 can be adjusted in accordance with the head size of the user. In the headphones 11, the slide adjustment mechanism by the slide portions 27 or the tongue piece portions 31 may be omitted.

A cable 33 connected to substrates or the like provided on the left and right housings 13 is inserted into the headband portion 17. The cable 33 can follow displacement in a length due to a movement of the slide portion 27 since the cable 33 is bent and housed in a wave shape. Both ends of the cable 33 are led out from the slide portions 27 and drawn into the left and right housings 13.

The headband portion 17 includes a pair of holding members 35 and a belt-shaped cover member 37. The pair of holding members 35 including the end members 29 are provided at both end portions of the headband portion 17. In the headphones 11, the belt-shaped hollow cover member 37 is provided between the pair of holding members 35 and is formed in a substantially semicircular arc shape. The pair of holding members 35 are formed of, for example, hard plastic that is difficult to deform (in other words, has high rigidity). In contrast, the cover member 37 is made of a material softer than the holding member 35. Accordingly, in the headphones 11, the cover member 37 is easily expanded by an operation of the user. A plurality of parallel slits 39 for facilitating deformation in an expanding direction of the headband portion 17 are provided in a radially inner surface of the cover member 37. The pair of holding members 35 and the cover member 37 house a substantially semicircular arc-shaped headband spring 41. In other words, the headband spring 41 is covered by the belt-shaped hollow cover member 37 and the pair of holding members 35.

Figure 3:
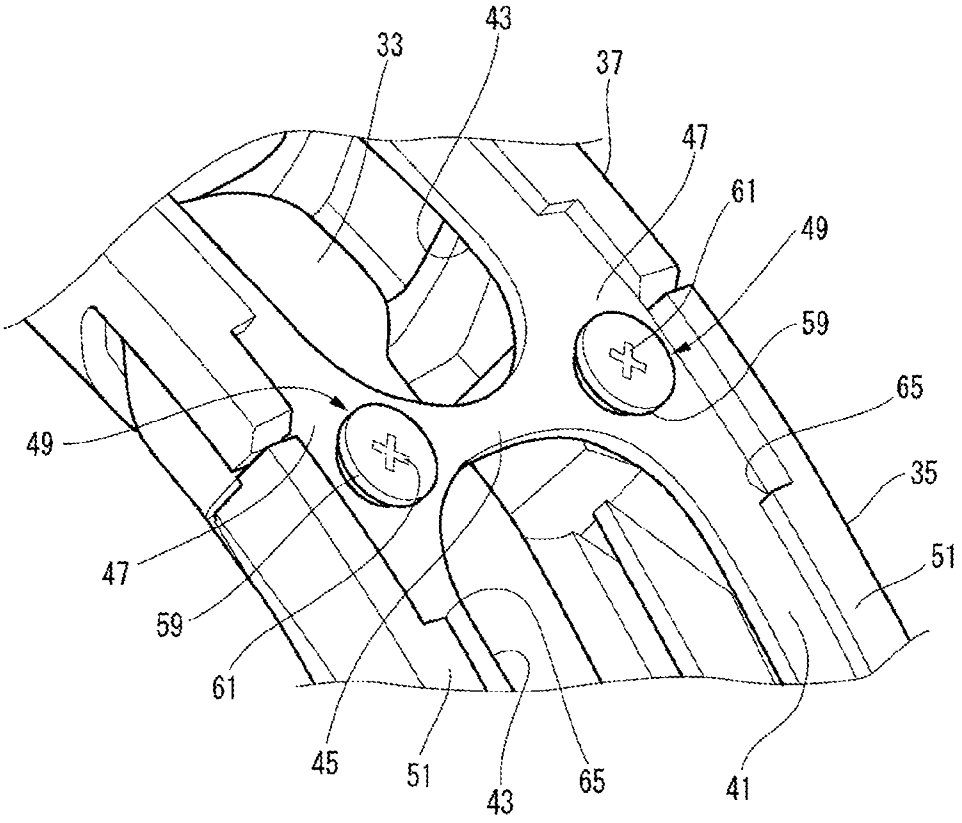
FIG. 3 is an enlarged view of a main part in the vicinity of stepped screws of the headband portion shown in FIG. 2.

FIG. 3 is an enlarged view of a main part in the vicinity of stepped screws of the headband portion 17 shown in FIG. 2. The headband spring 41 is housed in both the cover member 37 and the holding members 35. The headband spring 41 is formed in, for example, a plate spring shape, and is expandable by being bent in a substantially semicircular arc shape in a longitudinal direction orthogonal to a plate width direction of the headband spring 41. A central portion of the headband spring 41 is disposed in the vicinity of a head top portion of the user, and both end portions of the headband spring 41 housed in the holding members 35 are arranged on both side head portions of the user. A plurality of oval punched portions 43 are formed in the headband spring 41 along the longitudinal direction of the headband spring 41. A bridge portion 45 is formed between the adjacent punched portions 43.

In the headband spring 41, the bridge portion 45 disposed on the holding member 35 is held to the holding member 35 by a pair of stepped screws 49. The pair of stepped screws 49 is arranged on both edge portions 47 of the headband spring 41 in a plate-width direction of the headband spring 41.

Here, as described above, the pair of holding members 35 have rigidity that restricts elastic deformation of the headband spring 41 in a plate thickness direction of the headband spring 41. Both end portions of the head band spring 41 are inserted into and held by the holding members 35. Therefore, the headband spring 41 is elastically deformed mainly at a portion not drawn into the holding members 35.

The holding member 35 includes a pair of pressing plate portions 51 that are arranged in parallel to each other and hold the both edge portions 47 of the headband spring 41 in the plate thickness direction of the headband spring 41. The holding member 35 is provided with a clearance C (see FIG. 7) between the pressing plate portions 51 and the headband spring 41. More specifically, the pressing plate portions 51 are formed to protrude inward in a plate width direction of the headband spring 41 and are arranged on an upper side of a groove 53 (see FIG. 5) that houses the headband spring 41. A distance of the groove 53 that houses the headband spring 41 in the plate thickness direction of the headband spring 41 is formed to be, for example, 1.1 mm. A plate thickness of the headband spring 41 housed in the groove 53 is formed to be, for example, 0.8 mm. Therefore, in a state where the headband spring 41 is close to one side of the groove 53, the clearance C is 0.3 mm. In the headphones 11, the clearance C serves as a play of the headband spring 41 and is held by the holding members 35. The pair of pressing plate portions 51 may also be provided on the cover member 37.

Figure 4:
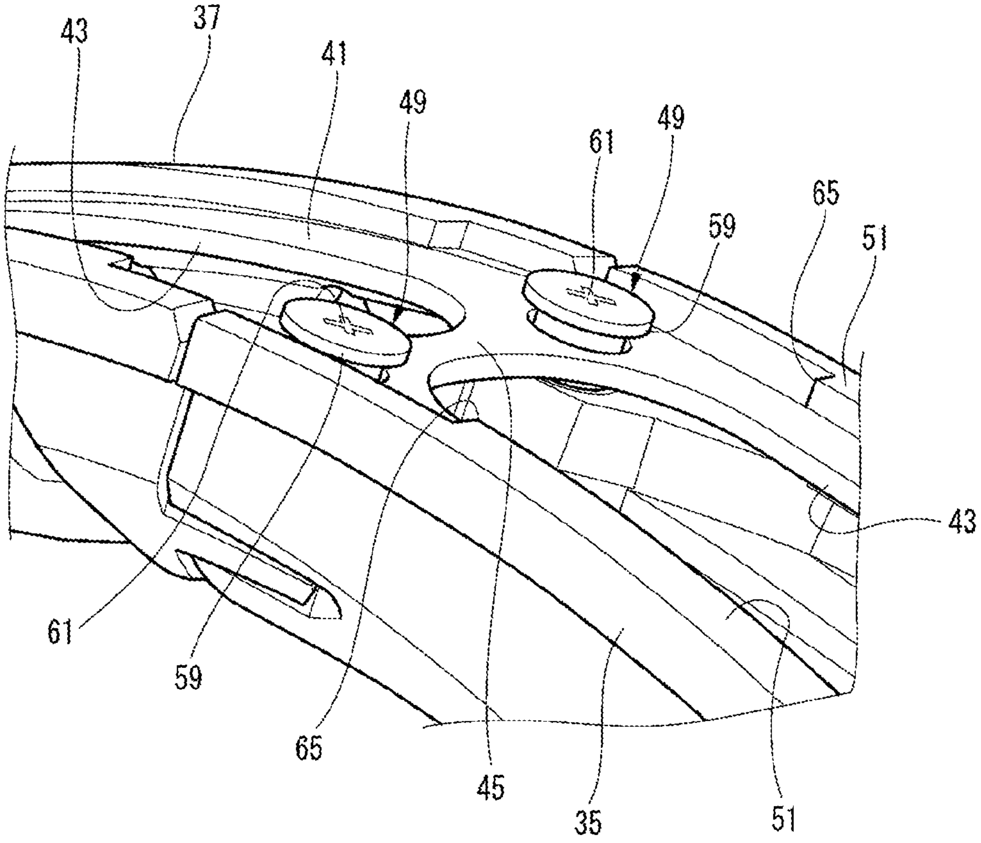
FIG. 4 is an enlarged view of the main part of FIG. 3 when viewed from a different angle.

FIG. 4 is an enlarged view of a main part in the vicinity of stepped screws of the headband portion shown in FIG. 2 when viewed from an angle different from the angle of FIG. 3. The pair of stepped screws 49 pass through both end side portions of the headband spring 41 in the plate thickness direction and are screwed to the holding member 35. A male screw portion 55 (see FIG. 5) is formed at a tip end of the stepped screw 49. On a base end side of the male screw portion 55, a shaft portion 57 formed in a columnar shape having an outer diameter larger than that of the male screw portion 55 is formed. At a base end of the shaft portion 57, a flange portion 59 having a diameter larger than that of the shaft portion 57 is formed. For example, a cross hole 61 is coaxially recessed in a base end surface of the flange portion 59. In the stepped screw 49, the male screw portion 55 is screwed into the holding member 35, and the exposed shaft portion 57 is inserted into an insertion hole 63 of the headband spring 41 (see FIG. 5). The insertion hole 63 has an inner diameter larger than an outer diameter of the shaft portion 57 and smaller than an outer diameter of the flange portion 59. That is, the stepped screw 49 holds the headband spring 41 movably in an axial direction of the stepped screw 49 with a gap larger than the plate thickness of the headband spring 41 between the flange portion 59 and the holding member 35.

Figure 5:
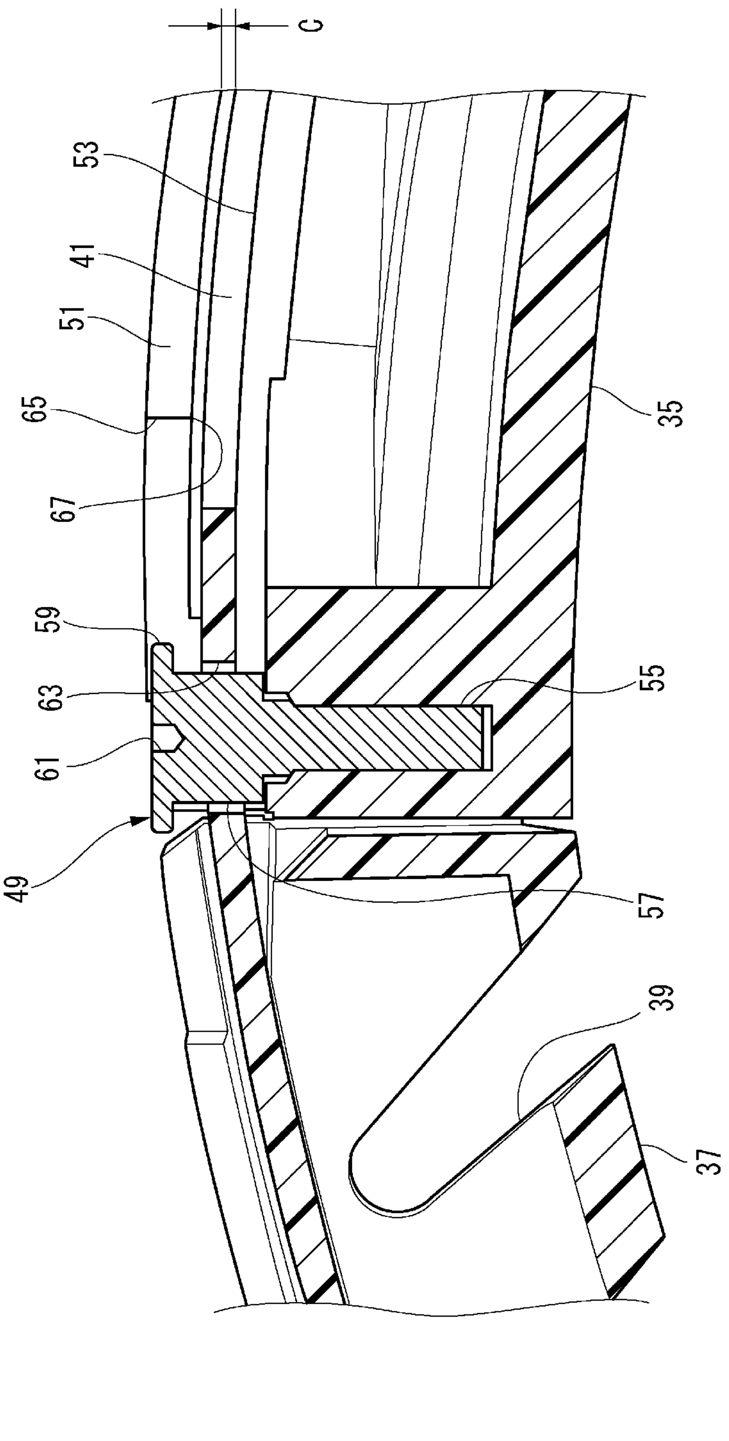
FIG. 5 is a side cross-sectional view of a stepped screw position of the headband portion.

FIG. 5 is a side cross-sectional view of a stepped screw position of the headband portion 17. Since the headband spring 41 is held by the holding member 35 with the clearance C in the plate thickness direction of the headband spring 41, the headband spring 41 can be moved in a direction in which the clearance C is reduced (upward direction in FIG. 5) in a state shown in FIG. 5.

Further, the headphones 11 include, at a lead-out tip end portion of the headband spring 41 of the holding member 35, a cutout portion 65 (see FIG. 3) from which the pair of pressing plate portions 51 are removed. Since the holding member 35 includes the cutout portion 65, the holding member 35 functions to release restriction of the pressing plate portions 51 that restrict a certain amount or more of elastic deformation of the headband spring 41.

Figure 6:
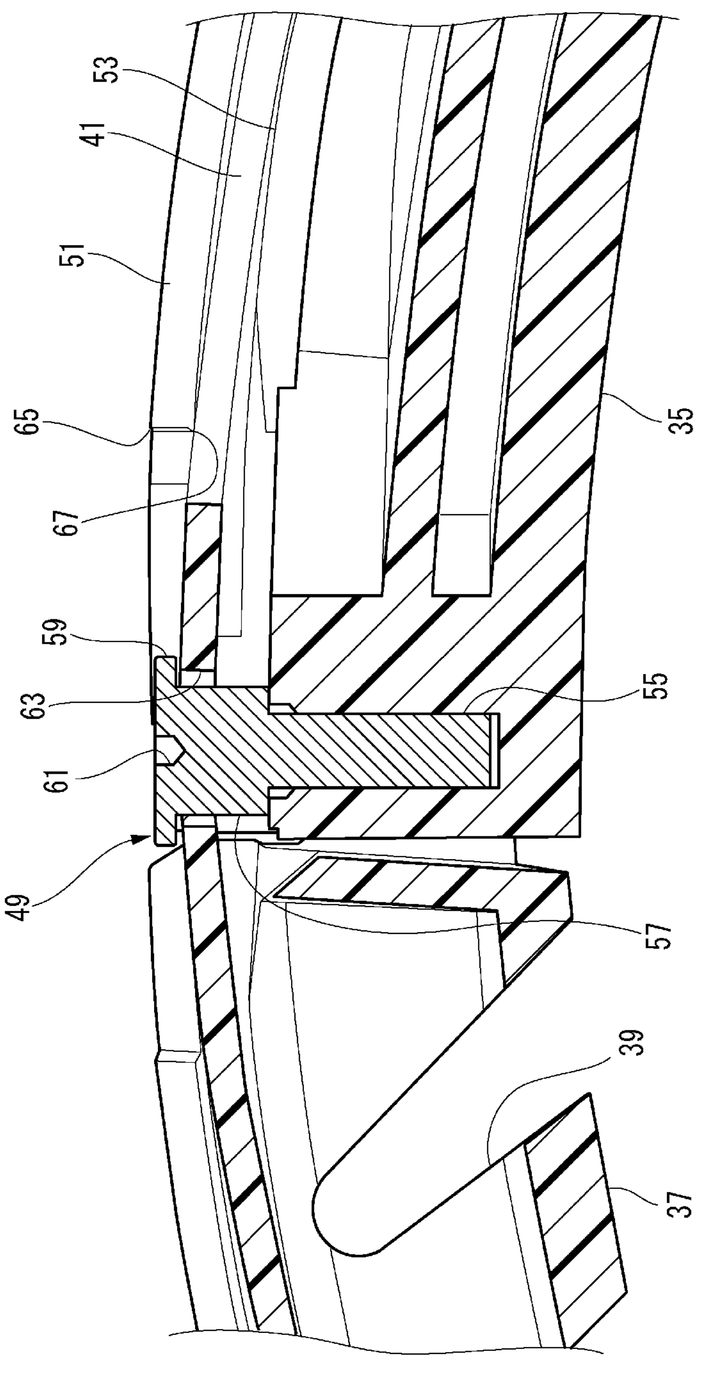
FIG. 6 is a side cross-sectional view in which a headband spring is moved from the position of FIG. 5 to a position where the headband spring abuts against a flange portion of the stepped screw.

FIG. 6 is a side cross-sectional view in which the headband spring 41 is moved from a position illustrated in FIG. 5 to a position where the headband spring 41 abuts against the flange portion 59 of the stepped screw 49. Since the headphones 11 are provided with the cutout portion 65, even when the headband spring 41 is moved in a direction in which the clearance C reduces or disappears from the state shown in FIG. 5 and an upper surface of the headband spring 41 abuts against a cutout-portion-side tip end portion 67, the headband spring 41 can be further moved in the same direction (the upward direction in FIG. 6) in the cutout portion 65.

Next, an operation of the headphones 11 according to the first embodiment will be described.

The headphones 11 according to the first embodiment include the plate-spring-shaped headband spring 41, the pair of holding members 35 and the pair of stepped screws 49. The plate-spring-shaped headband spring 41 is bent in the substantially semicircular arc shape in the longitudinal direction of the headband spring 41 so as to be formed to be expandable. In response to the headphones 11 being placed on wearer's head, the central portion of the headband spring 41 is disposed in the vicinity of the head top portion of the wearer, and the both end portions headband spring 41 are arranged on both side head portions of the wearer. The pair of holding members 35 have the rigidity that restricts the elastic deformation of the headband spring 41 in the plate thickness direction in the headband spring 41, and are configured to insert and hold the pair of both end portions. The pair of stepped screws 49 pass through both end side portions of the headband spring 41 in the plate thickness direction and are screwed to the holding member 35, and hold the headband spring 41 movably in the axial direction of the pair of stepped screws 49 with the gap larger than the plate thickness of the headband spring 41 between the flange portions 59 and the holding member 35. The pair of stepped screws 49 are arranged at both end side portions of the headband spring 41 in the plate width direction of the headband spring 41, and the plate width direction is orthogonal to the longitudinal direction of the headband spring 41.

In the headphones 11, the headband spring 41 is formed to be bent in the substantially semicircular arc shape. The headband spring 41 having a substantially semicircular arc-shape is used by being expandable in a direction in which both end portions of the headband spring 41 are separated from each other by an operation of the wearer. The headband spring 41 is deformed in a shape closer to a flat surface (a curvature is reduced) by expanding the both end portions of the headband spring 41 by the operation of the wearer. At this time, a stress (that is, an elastic restoring force) in a direction in which the both end portions of the headband spring 41 approach each other is generated in the headband spring 41. Here, the stress is a magnitude per unit area of an internal force in an opposite direction generated inside the headband spring 41 with respect to an external force (that is, a force generated by the operation of the wearer).

When the headphones 11 are used for a person having a large head of the size L as compared with a person having a small head of the size S, the headband spring 41 is deformed in a shape closer to a flatter surface (that is, the curvature is reduced). Therefore, when the headphones 11 are used for the head of the size L rather than the head of the size S, an elastic restoring force (lateral pressure) applied to the both side head portions of the head acts more greatly.

The headphones 11 are held by inserting both end portions of the headband spring 41 into the pair of holding members 35, respectively. The both end portions of the headband springs 41 inserted into the respective holding members 35 are held to the holding members 35 by the pair of stepped screws 49 that pass through the both end side portions of the headband spring 41 in the plate thickness direction. The stepped screw 49 holds the headband spring 41 to the holding member 35 with the gap larger than the plate thickness of the headband spring 41 between the flange portion 59 and the holding member 35. That is, the headband spring 41 is held by the stepped screw 49 so as to be movable in the axial direction of the stepped screw 49.

For example, in headphones according to a comparative example as a related-art headphones, a headband spring mounted on the headphones is fastened (rigidly fixed) to the holding members 35 by fixing screws at the positions of the stepped screws 49. Therefore, in the headphones according to the comparative example, the headband spring has an elastically deformable region between two fixing screw positions in which both end portions are rigidly fixed to the respective holding members 35 (see FIG. 8A) by the fixing screws along a longitudinal direction of the headband spring.

On the contrary, in the headphones 11 according to the first embodiment, the position where the headband spring is rigidly fixed to the holding member 35 by the fixing screw in the headphones of the comparative example is held movably by the stepped screw 49 in the axial direction of the stepped screw 49. As a result, in the headphones 11 according to the first embodiment, the elastically deformable region of the headband spring 41 becomes longer toward a spring end portion side of the headband spring 41 than the fixing screw position according to the comparative example (see FIG. 8B).

The headband spring 41 having substantially the same material and shape as the related-art headband spring has the increased elastically deformable region. Therefore, particularly, even when the both end portions of the headband spring 41 are used to be expanded with the head of the size L, it is possible to prevent the lateral pressure applied to the both side head portions of the wearer from greatly acting as compared with the related art. That is, the headphones 11 are configured to be able to prevent a lateral pressure variation due to a head size of the wearer. Therefore, according to the headphones 11 of the first embodiment, it is possible to prevent the variation in the lateral pressure from the ear pads due to a head size of the wearer, and it is possible to provide a comfortable wearing feeling regardless of the head size of the wearer.

In the headphones 11, the headband spring 41 is held by the holding members 35 with the clearance C in the plate thickness direction of the headband spring 41.

Figure 7:
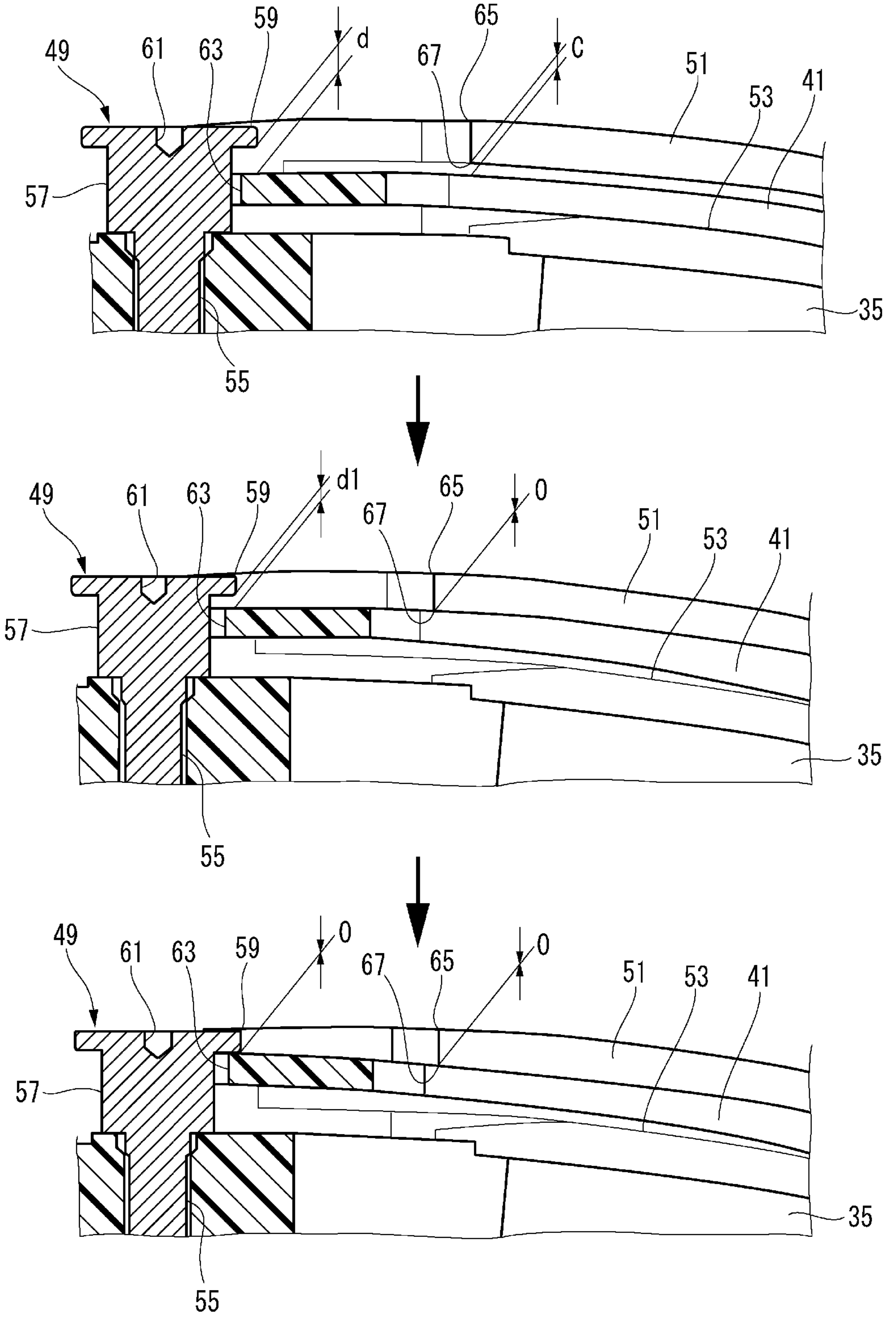
FIG. 7 is an operation explanatory diagram illustrating a process of movement of the headband spring.

FIG. 7 is an operation explanatory diagram illustrating a process of movement of the headband spring 41. In the headphones 11 according to the first embodiment, the headband spring 41 is held by the holding members 35 with the clearance C in the plate thickness direction. At this time, the flange portion 59 and the headband spring 41 are separated from each other by a distance d larger than the clearance C. The headband spring 41 is held to the holding member 35 by the stepped screw 49 and is movable in the axial direction of the stepped screw 49 at a lead-out tip end portion of the holding member 35. In the process of moving the headband spring 41 in a direction approaching the flange portion 59 of the stepped screw 49, the clearance C provided between the holding member 35 and the headband spring 41 disappears (C=0) before the headband spring 41 is in contact with the flange portion 59. That is, the movement of the headband spring 41 is restricted by the holding member 35 before the headband spring 41 hits the flange portion 59.

At this time, the flange portion 59 and the headband spring 41 are still separated from each other by a distance d1 smaller than the distance d.

A gap having the distance d1 exists between the headband spring 41 and the flange portion 59 in a state where the movement of the headband spring 41 is restricted by the cutout-portion-side tip end portion 67 of the holding member 35. Since the cutout portion 65 is provided, the headband spring 41 can be further elastically deformed between the cutout-portion-side tip end portion 67 and the stepped screw 49 by the distance d1 by which the headband spring 41 hits the flange portion 59. Accordingly, the headband spring 41 can be displaced (moved) both in a period until the headband spring 41 is in contact with the cutout-portion-side tip end portion 67 and the clearance C disappears and in a period until the headband spring 41 hits the flange portion 59 after the headband spring 41 is in contact with the cutout-portion-side tip end portion 67.

Figure 8A:
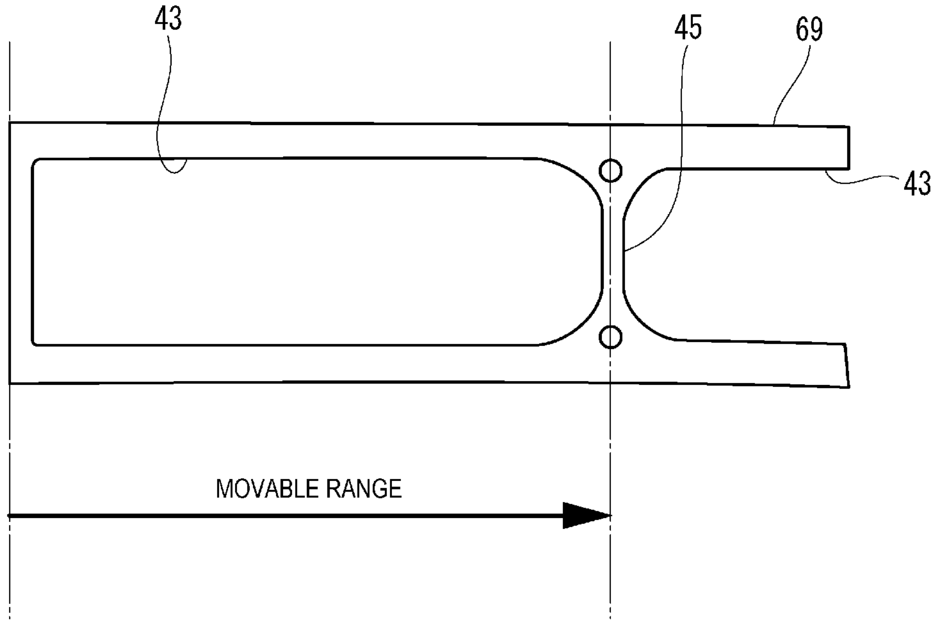
FIG. 8A is a diagram showing a movable range of a headband spring according to a comparative example.
Figure 8B:
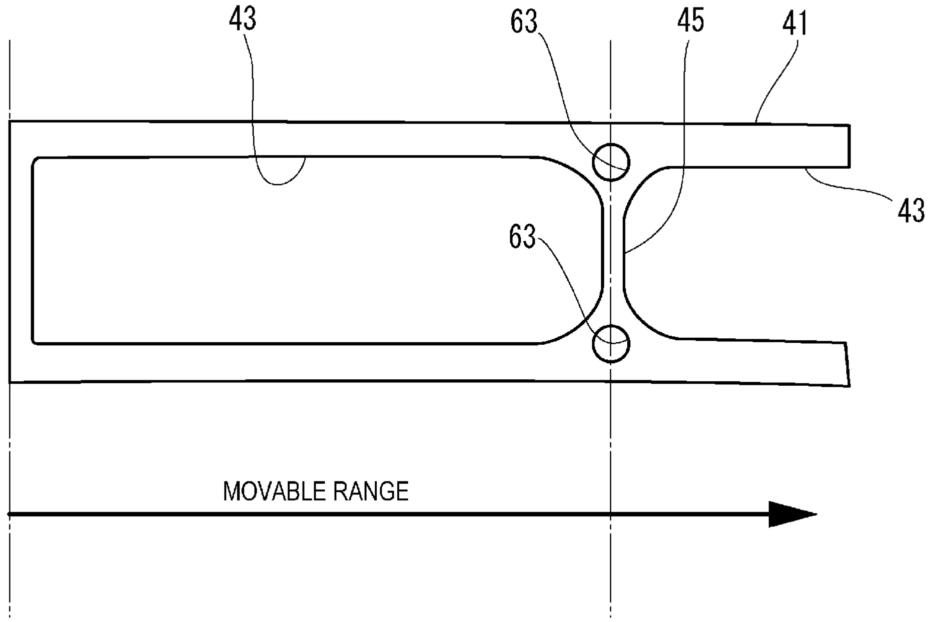
FIG. 8B is a diagram showing a movable range of the headband spring according to the first embodiment.

FIG. 8A is a diagram showing a movable range of a headband spring 69 according to the comparative example. FIG. 8B shows a movable range of the headband spring 41 according to the first embodiment.

Accordingly, in the headphones 11, by using the clearance C and the stepped screws 49, a movable range of the headband spring 41 can be secured even in a region where the headband spring cannot be operated in the related art, and elasticity of the headband spring 41 can be used in a longer region (range).

In the headphones 11, the holding member 35 includes the pair of pressing plate portions 51 that are arrange in parallel to each other and hold the plate-width-direction both edge portions 47 of the headband spring 41 in the plate thickness direction, and the clearance C is provided between the pressing plate portions 51 and the headband spring 41.

In the headphones 11 according to the first embodiment, the holding member 35 includes the pair of pressing plate portions 51 that hold the plate-width-direction both edge portions 47 of the headband spring 41 in the plate thickness direction. The plate-width-direction both edge portions 47 of the headband spring 41 are pressed by the pair of pressing plate portions 51. The above-described clearance C is provided between the headband spring 41 and the pressing plate portions 51. When both end portions of the headband spring 41 are expanded and the headband spring 41 is deformed in a direction so that the shape of the headband spring 41 being closer to the flat surface (the direction in which the curvature is reduced), the headband spring 41 is moved in a direction approaching the pressing plate portions 51, and finally is in contact with the pressing plate portions 51 to restrict the movement of the headband spring 41.

In the headphones 11, the cutout portion 65, which releases the restriction of the elastic deformation, is formed in the lead-out tip end portion of the headband spring 41 of the holding member 35 by removing the pair of pressing plate portions 51.

Figure 9:
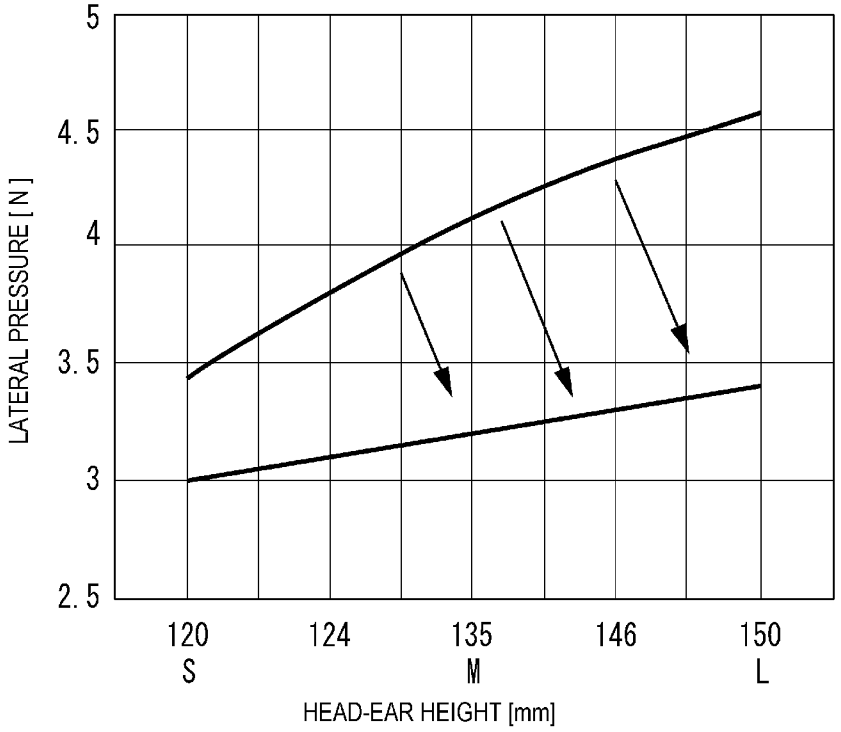
FIG. 9 is an explanatory diagram of a correlation between a head size and a lateral pressure obtained by comparing the headband spring of the comparative example with the headband spring of the first embodiment.

FIG. 9 is an explanatory diagram of a correlation between a head size and a lateral pressure obtained by comparing the headband spring 69 of the comparative example with the headband spring 41 of the first embodiment. In FIG. 9, a vertical axis represents a lateral pressure [N], and a horizontal axis represents a head-ear height [mm] that varies depending on the heads of the size S to the size L.

In the headphones 11 according to the first embodiment, the holding member 35 includes, at the lead-out tip end portion of the headband spring 41, the cutout portion 65 from which parts of the pressing plate portions 51 are removed. Since the pressing plate portions 51 exist, the movement of the headband spring 41 in a direction approaching the flange portion 59 is restricted at the lead-out tip end portion of the holding member 35. The movement of the headband spring 41 in the direction approaching the flange portion 59 is not restricted at the cutout portion 65 where the pressing plate portions 51 are not provided. When the headband spring 41 is moved in the direction approaching the flange portion 59, the headband spring 41 hits the cutout-portion-side tip end portion 67 of the pressing plate portions 51. The headband spring 41 that hits the cutout-portion-side tip end portion 67 can be moved by being bent (elastically deformed) in the direction approaching the flange portion 59 in a space between the cutout-portion-side tip end portion 67 and the flange portion 59 (that is, the cutout portion 65).

Accordingly, the headband spring 41 can exert elasticity, which has not been obtained in the related art, in the cutout portion 65. That is, a spring constant can be reduced in a range of the size S to the size L of the heads. As a result, regarding the headphones 11, even when a head size is increased, the lateral pressure can be unlikely to increase as compared with the related-art structure.

In the headphones 11, the headband spring 41 arranged between the pair of holding members 35 is covered by the belt-shaped hollow cover member 37 made of the material softer than material of the holding members 35.

In the headphones 11, both end portions of the headband spring 41 formed in the substantially semicircular arc shape are held by the respective holding members 35, and the headband spring 41 arranged between the pair of holding members 35 is covered by the cover member 37. The cover member 37 is formed of the material softer than the material of the holding member 35. The cover member 37 can be deformed such that elasticity of the movable region of the headband spring 41 is not impaired. As shown in FIG. 1, in appearance, the headphones 11 have substantially the same cross-sectional shape at any positions from one holding member 35 to the other holding member 35 via the cover member 37. Accordingly, the headphones 11 can house the elastic mechanism portion that can prevent the lateral pressure variation due to a head size in the headband portion 17 while having a unified and a good-looking design.

Although various embodiments have been described above with reference to the accompanying drawings, the present disclosure is not limited to these embodiments. It will be apparent to those skilled in the art that various modifications, corrections, substitutions, additions, deletions, and equivalents can be conceived within the scope described in the claims, and it is to be understood that such modifications, corrections, substitutions, additions, deletions, and equivalents also fall within the technical scope of the present disclosure. Components in the above-described various embodiments may be combined optionally in the range without deviating from the spirit of the invention.

The present disclosure is useful as a headphones that prevents a variation in a lateral pressure from ear pads due to a head size of a wearer and that provides a comfortable wearing feeling regardless of the head size of the wearer.

What is claimed is:

1. A headband portion for headphones comprising:

a headband spring having a plate-spring shape, and being bent in a substantially semicircular arc shape so as to be expandable in a longitudinal direction orthogonal to a plate width direction of the headband spring so that a central portion of the headband spring is disposed in a vicinity of a head top portion of a wearer and a pair of both end portions of the headband spring are arranged on both side head portions of the wearer in response to the headphones being placed on the wearer's head;

a pair of holding members having rigidity to restrict elastic deformation of the headband spring in a plate thickness direction of the headband spring, and configured to hold the pair of both end portions by inserting the pair of both end portions into the pair of holding members; and a pair of stepped screws that passes through both end side portions of the headband spring in the plate thickness direction and is screwed to the pair of holding members, and that holds the headband spring movably in an axial direction of the pair of stepped screws with gaps between flange portions of the pair of stepped screws and the pair of holding members, the gaps being larger than a plate thickness of the headband spring, and the both end side portions of the headband spring being arranged in the plate width direction.

2. The headband portion for the headphones according to claim 1, wherein the headband spring is held by the holding members with clearances in the plate thickness direction.

3. The headband portion for the headphones according to claim 2, wherein the pair of holding member comprises a pair of pressing plate portions configured to hold both edge portions of the headband spring in the plate thickness direction, the pair of pressing plate portions being arranged in parallel to each other, and the both edge portions being arranged in the plate width direction, and wherein the clearances are provided between the pair of pressing plate portions and the headband spring.

4. The headband portion for the headphones according to claim 3, wherein a cutout portion, which is configured to release restriction of the elastic deformation of the headband spring, is formed at a position corresponding to a lead-out tip end portion of the headband spring by removing the pair of pressing plate portions from the pair of holding members.

5. The headband portion for the headphones according to claim 1, wherein the headband spring arranged between the pair of holding members is covered by a belt-shaped hollow cover member made of a material softer than a material of the holding members.

6. Headphones comprising:

the headband portion for the headphones according to claim 1; and a pair of housings that are attached to both end portions of the headband portion.

7. The headphones according to claim 6, further comprising:

a pair of coupling members that are respectively provided between the both end portions of the headband portion and the housings.

8. The headphones according to claim 7, wherein each of the pair of coupling members includes a band connection portion connected to the headband portion, and a housing support portion that extends from the band connection portion and supports one of the housings.

9. The headphones according to claim 6, wherein an ear pad, which covers an entire ear of a wearer when the headphone is placed on the wearer's head, is attached to a facing surface of each of the housings.

* * * * *